(12) United States Patent
Konijn et al.

(10) Patent No.: US 6,905,112 B2
(45) Date of Patent: Jun. 14, 2005

(54) COLUMN FOR COUNTER-CURRENTLY CONTACTING VAPOR AND LIQUID

(75) Inventors: Gerrit Konijn, Amsterdam (NL); Hugo Martijn Letzel, Amsterdam (NL)

(73) Assignee: Shell Oil Company, Houston, TX (US)

(*) Notice: Subject to any disclaimer, the term of this patent is extended or adjusted under 35 U.S.C. 154(b) by 211 days.

(21) Appl. No.: 10/399,993

(22) PCT Filed: Oct. 23, 2001

(86) PCT No.: PCT/EP01/10111

§ 371 (c)(1),
(2), (4) Date: Apr. 23, 2003

(87) PCT Pub. No.: WO02/34350

PCT Pub. Date: May 2, 2002

(65) Prior Publication Data

US 2004/0026801 A1 Feb. 12, 2004

(30) Foreign Application Priority Data

Oct. 23, 2000 (EP) .............................. 00203680

(51) Int. Cl.⁷ .................................................. B01D 3/20
(52) U.S. Cl. ..................................................... 261/78.1
(58) Field of Search ........................................ 261/78.1

(56) References Cited

U.S. PATENT DOCUMENTS 4,132,604 A * 1/1979 Alexion et al. ............... 203/87
4,361,469 A 11/1982 Trutna
5,683,629 A 11/1997 Konijn
5,695,548 A 12/1997 Trutna
5,885,488 A 3/1999 Konijn
6,059,934 A 5/2000 Stober et al.

FOREIGN PATENT DOCUMENTS

| BE | 584426 | 11/1959 | |
|----|--------|---------|---|
| DE | 109 804 | 11/1974 | ............ B01D/3/14 |
| JP | 54 107472 | 8/1979 | |
| SU | 902 784 | 2/1982 | |
| WO | 9525571 | 9/1995 | ............ B01D/3/16 |

* cited by examiner

Primary Examiner—Chester T. Barry
(74) Attorney, Agent, or Firm—Charles W. Stewart

(57) ABSTRACT

A column for counter-currently contacting vapour and liquid comprising a plurality of horizontal contact trays arranged axially spaced apart in the column, each contact tray being provided with a vapour-liquid contacting area, a liquid receiving area, a downcomer area and an overflow weir between downcomer area and contact area, and which column is further provided with a plurality of horizontal separation trays, each separation tray being spatially arranged above a contact tray, said separation tray having means to separate entrained liquids from the upwardly moving vapour and means to return the thus separated liquid to a contact tray below, wherein the vapour-liquid contacting area is provided with atomiser means where in said atomiser means liquid can be dragged from a continuous liquid phase into a flow of vapour to form a dispersion of vapour and liquid droplets.

10 Claims, 3 Drawing Sheets

COLUMN FOR COUNTER-CURRENTLY CONTACTING VAPOR AND LIQUID

The present invention relates to a column for counter-currently contacting vapour and liquid comprising a plurality of horizontal contact trays arranged axially spaced apart in the column, each contact tray being provided with a vapour-liquid contacting area, a liquid receiving area, a downcomer area and an overflow weir between downcomer area and contact area, and which column is further provided with a plurality of horizontal separation trays, each separation tray being spatially arranged above a contact tray, said separation tray having means to separate entrained liquids from the upwardly moving vapour and means to return the thus separated liquid to a contact tray below.

Such a tray is known from WO-A-9525571. This publication describes a column as above, wherein the vapour-liquid contacting area is of the sieve tray type and the separation tray consists of a plurality of swirl tubes as means for removing liquid droplets from the mixture of vapour and liquid droplets. In revamps of existing columns contact trays are often replaced by the above described contacting and separation trays in order to improve the capacity.

During normal operation of a column as described in WO-A-9525571 vapour flows upwards through the sieve tray openings of the contact tray and liquid is supplied onto the contact tray through the downcomer of the next higher contact tray. Liquid collected on the contact tray forms a layer on the contact tray and contacting of vapour and liquid takes place in this layer, wherein a so-called froth is formed. A froth is a mixture wherein liquid is the continuous phase and vapour bubbles are the discontinuous phase. Vapour and entrained liquid droplets will be discharged from the froth to the separation tray above. On the separation tray these liquid droplets are separated and returned to a lower contact tray.

A disadvantage of the above-described column is that the efficiency is relatively low at low flow parameters. At low flow parameters the volume of liquid is relatively small compared to the volume of vapour fed to the same column. When liquid is supplied from a liquid receiving area to the sieve tray type vapour-liquid contact area at a low liquid load and high vapour load, liquid would be blown off the tray immediately. This results in that only a fraction of the so-called liquid flow path over the contact tray will be efficiently used. This liquid maldistribution is detrimental for the efficiency of the tray.

DD-A-109804 describes a column provided with separation trays and contact trays, wherein the contact trays are provided with atomiser means, in which atomiser means liquid can be dragged from the contact tray into a flow of vapour to form an upwardly moving dispersion of vapour and liquid droplets. Applicants found that the disclosed column cannot be started. The desired liquid gas contact does not take effect, as one would expect.

The flow parameter is defined as $(L/G)*(\rho_1/\rho_g)^{1/2}$, wherein L is the liquid flow rate in m³/s, $\rho_1$ is the vapour flow rate in m³/s, $\rho_1$ is the liquid density in kg/m³, $\rho_g$ is the vapour density in kg/m³. With low flow parameter is especially meant flow parameters having a value of below 0.1.

The object of the present invention is to provide a column having contact and separation trays, having a higher mass transfer efficiency and a higher capacity at low flow parameters.

This object is achieved with the following column. Column for counter-currently contacting vapour and liquid comprising a plurality of horizontal contact trays arranged axially spaced apart in the column, each contact tray being provided with a vapour-liquid contacting area, a liquid receiving area, a downcomer area and an overflow weir between downcomer area and contact area, and which column is further provided with a plurality of horizontal separation trays, each separation tray being spatially arranged above a contact tray, said separation tray having means to separate entrained liquids from the upwardly moving vapour and means to return the thus separated liquid to a contact tray below, wherein the vapour-liquid contacting area is provided with atomiser means, in which atomiser means liquid can be dragged from a continuous liquid phase into a flow of vapour to form a dispersion of vapour and liquid droplets.

Because the vapour-liquid contacting area is provided with atomisers instead of sieve tray openings as in the column of WO-A-9525571, a layer of clear liquid will be present on the surface of the contact tray at both low and high flow parameters. This liquid layer will have a height of maximally the height of the overflow weir. This liquid layer ensures that even at low flow parameters liquid is better distributed over the tray before it contacts the upwardly moving vapour in the atomisers present in the vapour-liquid contact area.

Applicants further found that because the contact trays in the column are provided with downcomers, while the contact trays of DD-A-109804 are not provided with downcomers, no start-up problems are encountered, resulting in a liquid-gas contacting as would be expected. It has been found that these downcomers are essential for obtaining a column, which can be put in operation. In operation the function of these downcomers become less important. For this reason the size of said downcomers can be kept small.

In use a dispersion of upwardly moving vapour and liquid droplets will form in the atomiser means. This dispersion will as a whole or partly move co-currently towards the separation tray just above the contact tray. As a result only a small volume of liquid will leave the contact tray via its downcomer.

Because of the clear liquid layer present on both separation and contacting tray high liquid downcomer inlet velocities can be achieved. Because of these higher liquid velocities a smaller downcomer area will be required.

A further advantage of the use of atomiser means as compared to, for example, sieve plate openings in the vapour-liquid contact area is that the pressure drop across the contact tray is significantly lower. This follows from the fact that the minimum velocity to avoid weeping through an atomiser can for example be 3 to 4 times smaller than the minimum velocity over a sieve plate type opening. Weeping is the phenomenon that liquid from the liquid layer passes the contact tray through the sieve tray type openings or openings in the atomiser. Because of this lower minimum velocity, atomisers having a higher open area can be used, resulting in a lower pressure drop across the contact tray.

The atomiser means can be any known means, which is capable of forming a dispersion of vapour and liquid droplets by contacting a stream of vapour with a continuous liquid phase. Preferably the atomiser means is formed by an opening in the surface of the vapour-gas contact area, wherein vertically above the opening a passage for upwardly moving vapour is present, which vapour passage is defined by a sidewall separating the vapour passage from the continuous liquid phase. The sidewall is furthermore provided with one or more openings for passage of liquid from the continuous liquid layer present on the surface of the vapour-liquid contacting area to the vapour passage. The sidewall suitably extends to a position above the overflow weir. The opening in the sidewall is as a consequence positioned at a lower position than the top end of the overflow weir in order to submerge these openings in the continuous liquid layer. With a continuous liquid layer is understood liquid substantially free of vapour bubbles.

The total area of the openings in the sidewall will depend on the flow parameter at which the column should operate. Lower flow parameters will be associated with a lower total area. The area of the openings can be suitably varied by using a plurality of smaller openings up to using larger single openings per sidewall.

The opening in the sidewall may be provided with an inclined tube, fluidly connecting the liquid layer and the vapour passage. Such a tube will point upwards in the direction of vapour flow. More preferably the vapour passage is provided with a restriction positioned below or at the opening in the sidewall. In use this restriction creates in the vapour passage a local lower pressure, which ensures that liquid flows from the tray surface via the openings in the sidewall to the vapour passage. Preferably the restriction is formed by the design of the lower part of the sidewall. Preferably the restriction is formed locally at the lower end of the opening in the sidewall. An example of a suitable restriction is a half-cup like extension of the sidewall attached to the lower half of, for example, a circular opening in said sidewall. Another suitable restriction has the form of an inclined lip extending from a horizontal lower end of a more elongated opening in the sidewall into the passage for upwardly moving vapour. The angle that the inclined lip makes with the horizontal tray surface is preferably between 10 and 80°. The form of the opening of the preferred atomiser in the vapour-liquid contacting area, when viewed from above, can be any form, for example circular, oval, square or rectangular. Examples of circular atomisers are described in SU-B-902784. More preferably these openings are elongated rectangular openings because such openings and their associated sidewall are easy to fabricate. Such rectangular openings are preferably arranged as a set of parallel openings spaced in the vapour-liquid contacting area. The specific arrangement is preferably so chosen that liquid can freely flow from the liquid receiving area to the downcomer area. Rectangular openings can for example be arranged such that their elongated side is arranged perpendicular to the overflow weir, from where they extend towards the liquid receiving area.

The total area for vapour passage of the openings in the vapour-liquid contacting area is preferably between 5 and 40% of the total cross-sectional area of the column.

The openings in the sidewall can be of any size and design, for example circular, oval, slit like or rectangular. For example a sidewall of a rectangular atomiser opening can be provided with a row of circular openings or more suitably with one or more elongated rectangular opening(s) along the length of the sidewall. Such rectangular openings in the sidewall can be easily provided with a rectangular lip by bending part of the wall material of the sidewall along the line formed by the lower end of the opening.

The invention shall be illustrated by making use of FIGS. 1–4.

Figure 1:
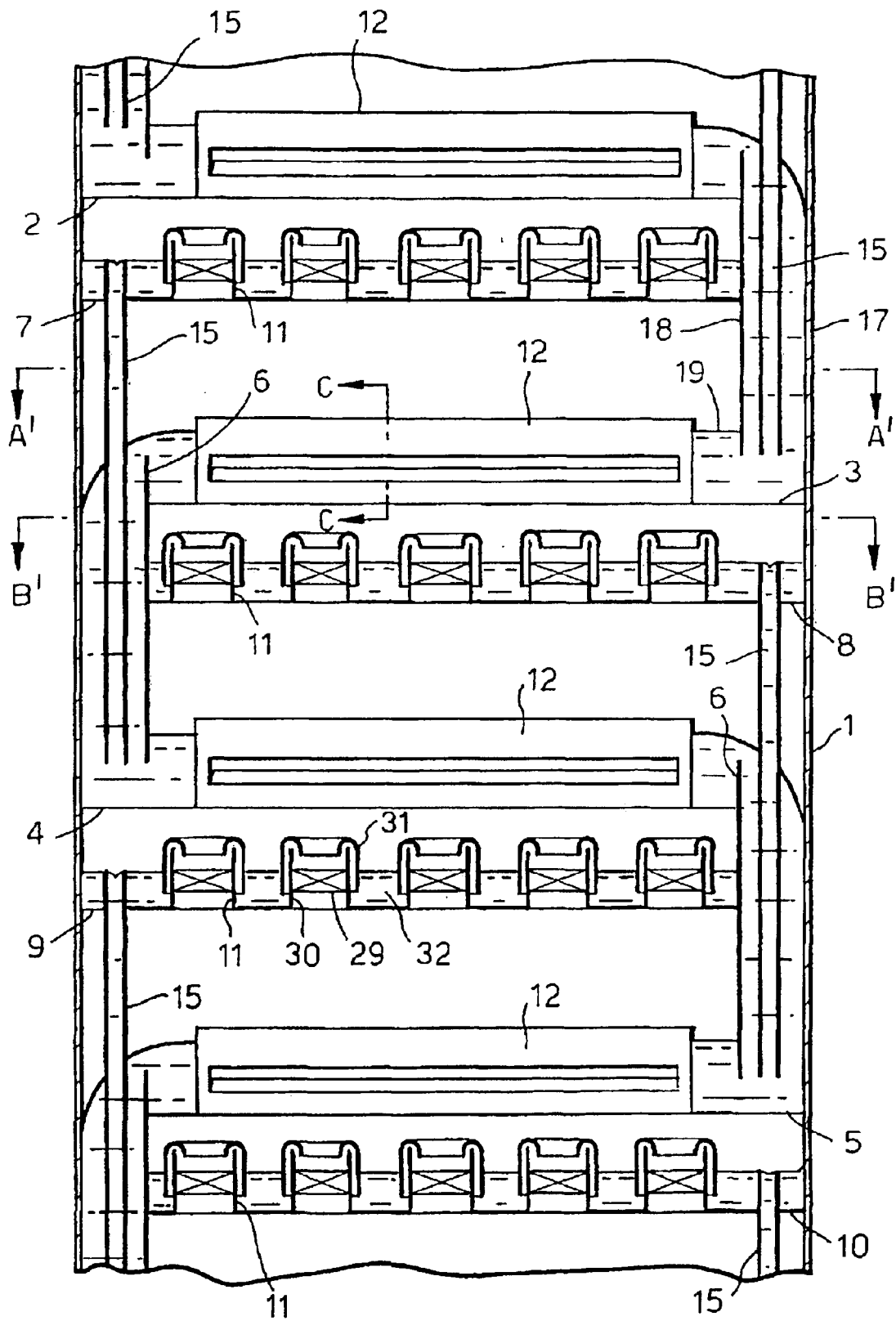
FIG. 1 is a schematically cross-sectional view of part of the column for counter-currently contacting vapour and liquid according to the present invention.

FIG. 1 shows a column (1) for counter-currently contacting vapour and liquid comprising a plurality of horizontal contact trays (2, 3, 4, 5) arranged axially spaced apart in the column (1). Each contact tray being provided with an overflow weir (6) and atomiser means (12) having an elongated rectangular form. The column (1) is further provided with a plurality of horizontal separation trays (7, 8, 9, 10). Each separation tray has a plurality of swirl tubes (11) as means to separate entrained liquids from the upwardly moving vapour. Furthermore a vertical conduit (15) is present to return the thus separated liquid on, for example, separation tray (7) to a lower contact tray (4).

FIG. 1 also shows a downcomer (17) formed by a downcomer wall (18) extending just above the contact tray surface of contact tray (3). In FIG. 1 the height of the overflow weir (6) is positioned higher than the lower end of downcomer wall (18) resulting in that the lower end of the downcomer is submerged in the liquid layer (19), which is present on contact tray (3). This embodiment is sometimes referred to as a downcomer, which has a liquid seal. Downcomers without a liquid seal can also be used in combination with the present invention.

Figure 2:
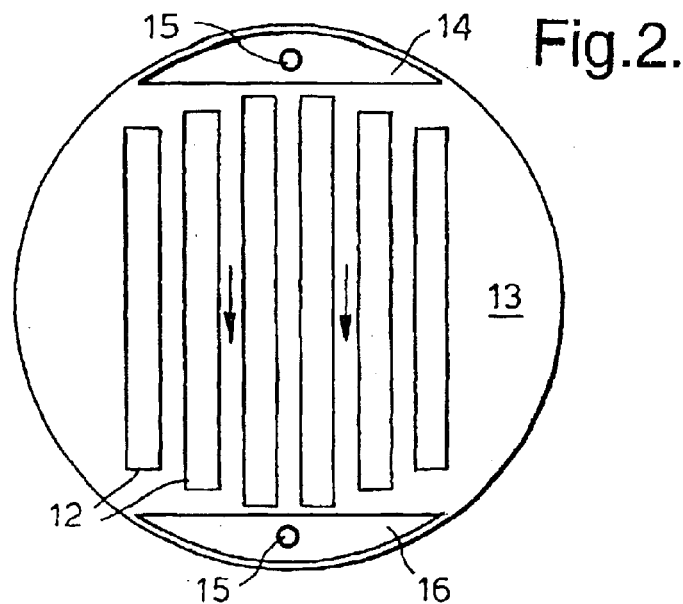
FIG. 2 is a cross-sectional view along lines AA' of FIG. 1.

FIG. 2 is a cross-sectional view along lines AA' of FIG. 1. FIG. 2 shows a top view of a contact tray (8) provided with a vapour-liquid contacting area (13), a liquid receiving area (14) and a downcomer area (16). Downcomer area (16) defines the liquid inlet opening (19) of the downcomer (17). FIG. 2 also shows a set of parallel-arranged rectangular formed atomisers (12). It is clear that in this embodiment liquid can freely flow from liquid receiving area (14) to downcomer area (16).

Figure 3:
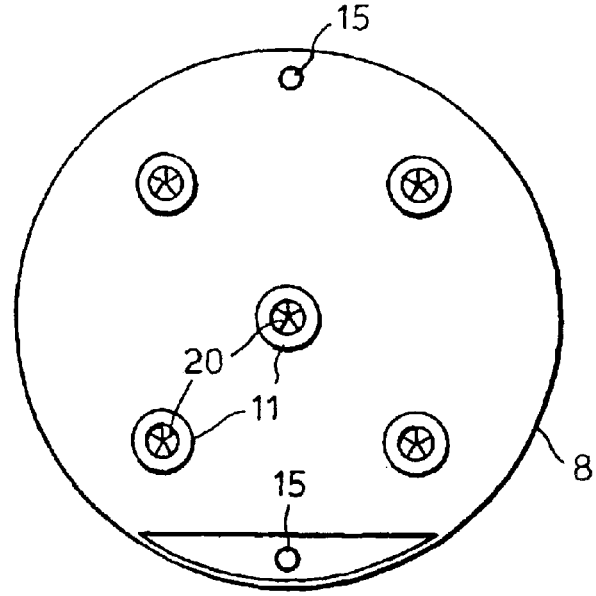
FIG. 3 is a cross-sectional view along lines BB' of FIG. 1.

FIG. 3 is a cross-sectional view along lines BB' of FIG. 1. FIG. 3 shows a top view of separation tray (8) provided with swirl tubes (11) and a liquid inlet opening of conduit (15). The swirl tubes (11) are provided with vanes (20) as swirl imparting means. In this cross-sectional view part of downcomer (17) and tube (15) is shown, for the transportation of liquid from higher positioned contact and separation trays.

Figure 4:
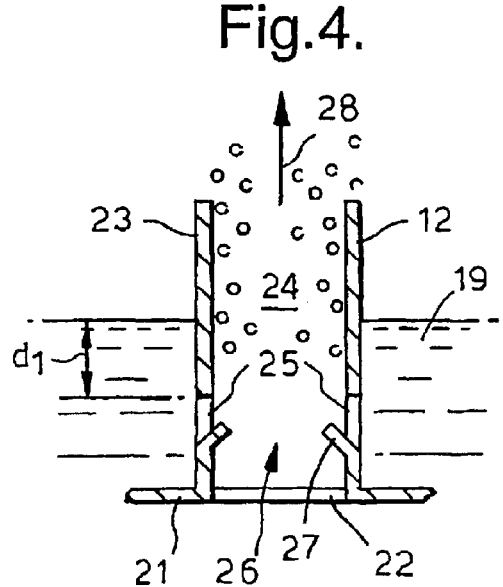
FIG. 4 is a cross-sectional view along lines CC' of FIG. 1.

FIG. 4 shows a cross-sectional view of a rectangular atomiser (12) and part of the tray surface (21) of contact tray (3). Atomiser (12) is formed by an opening (22) in the tray surface (21), which opening (22) is provided with a sidewall (23). The sidewall (23) is provided with an opening (25). The opening (22) and the sidewall (23) define a box like vapour passage (24). Through this passage (24) vapour will pass along arrow (26) the contact tray (3) upwardly. In the vapour passage (24) a restriction is present formed by two inclined lips (27) attached to the lower end of opening (22). In use the upwardly moving vapour drags liquid droplets from the liquid layer (19) through openings (25) into the vapour passage (24) forming an mixture of vapour and liquid droplets moving upwardly along arrow (28).

FIG. 4 also illustrates why a liquid layer will be present on the tray surface at a low flow parameter. Liquid is dragged into opening (25) because of the local, lower pressure in the vapour passage (24) and because of the local pressure of the liquid at the opening (25). This latter local pressure will depend on the column of clear liquid ($d_1$) above the opening. When less liquid is supplied to the surface of the contact tray (3) this liquid column will initially decrease. This will result in a lower pressure difference between liquid layer and vapour passage at opening (25), in turn resulting in a decrease in liquid flow. This decrease in liquid flow will balance out with the decrease in liquid supplied to the contact tray. By choosing appropriate areas for openings (25) and a sufficiently high sidewall (23) a liquid layer will be present at both low and high flow parameters as will be clear from the above explanation.

The separation tray (7, 8, 9, 10) is provided with separation means to separate entrained liquids from the upwardly moving vapour. Such separation means may be any means known to one skilled in the art to achieve such a separation. Examples of such means are knitted meshes as, vertical and parallel arranged corrugated plates as for example described in U.S. Pat. No. 6,059,934, and inclined and upwardly facing U-formed channels as for example described in U.S. Pat. No. 4,361,469 and U.S. Pat. No. 5,695,548. Preferably swirl tubes are used as means to separate liquid droplets because of their high separation efficiency. FIGS. 1 and 3 illustrate a separation tray provided with swirl tubes. An example of a suitable separation tray provided with swirl tubes is for example described in WO-A-9525571.

A swirl tube (11) is a circle cylindrical pipe (30) in which swirl imparting means (29) are arranged. During normal operation gas with entrained liquid flows through the swirl tube, and the swirl imparting means (29) cause the gas to rotate; under influence of centrifugal forces entrained liquid moves away from the centre of the swirl tube (11) and is collected on the inner surface of the circle cylindrical pipe (30) where a film of liquid is formed. At the upper end of the pipe the liquid film breaks up and liquid droplets move away from the pipe (30); these liquid droplets fall on the separation tray.

Preferably the swirl tubes are provided with an annular U-turn deflector (31) arranged over the upper end of the swirl tube (11). This ensures that liquid is forced to the surface of the separation tray. Entrainment of vapour with liquid in the swirl tube can be prevented by sealing the opening of the U-turn deflector by liquid (32) present on the separation tray (9) during normal operation. This is suitably accomplished by extending the outer wall of the U-turn deflector (31) to below the inlet (19) of the means to return liquid to a lower contact tray.

When swirl tubes as means to separate entrained liquid are combined with circular shaped atomiser means as described above care should be taken not to position these two devices in one vertical line. This because the swirling motion may continue in the vapour passage of the atomiser means, which is detrimental for an effective flow of liquid from the liquid layer into the vapour passage. In order to further minimise this effect antiswirl baffles can be positioned in the lower part of the vapour passage. With the above described and preferred rectangular atomiser means this detrimental effect is not present.

The separation tray (8) is further provided with means to return the liquid, which is obtained after separation in the separation means to a contact tray below. This is suitably the first contact tray (4) below the separation tray (8) when tray efficiency is to be improved. When the liquid handling capacity is to be improved, liquid is preferably returned to the second contact tray (5) below the separation tray (8). Such a means for returning liquid to a lower part in the column is suitably a vertical conduit (15). In case liquid is fed from the separation tray (8) to the second contact tray (5) below said separation tray (8) the liquid return conduit (15) suitably extends from the separation tray (8) into the downcomer (17) of the first contact tray (4) below said separation tray (8).

The downcomer area (16) on a contact tray (2) is the upper open end of a vertically extending downcomer (17). Such a downcomer has downcomer walls (18), wherein the wall of the column (1) may form one of its walls. The lower end of the downcomer (17) is positioned above the liquid receiving area (14) of the consecutive contact tray (3) below.

The lay out of the contact tray can be a simple one pass tray lay out, wherein liquid flows from a liquid receiving area at one end of the column to a downcomer area positioned at the opposite end of the column. More complex layouts as two-pass tray layout or contact trays with more than one parallel arranged rectangular downcomer areas can be used in especially larger diameter columns.

The distance between a contact tray and the above positioned separation tray will depend on desired tray efficiency and is preferably between 0.1 and 0.8 m. The distance between a separation tray and a contact tray is not critical and will be kept a small as possible.

The column according to the invention is preferably used as a gas-liquid contactor, for example as a distillation column, a stripping column or as an absorption column. In absorption columns a downwardly moving liquid is contacted with an upwardly moving gas. In a distillation column one or more components are typically separated from a feed. Typically the feed in a distillation column is supplied to an intermediate position in the column, wherein trays are present above and below said inlet position. Such a column is further provided with reboiler, condensation and reflux means.

Preferably the column is used for absorption, wherein the amount of liquid is very small relative to the amount of gas to be treated. An important application is drying of natural gas, wherein the natural gas is counter-currently contacted with a solvent for water vapour such a glycol. Such devices are typically operated at very low flow parameters suitably lower than 0.01. Known devices as for example described in U.S. Pat. No. 5,683,629 are known for glycol contacting of natural gas. The present tray is an improvement on this known device because a more efficient contacting is achieved.

The present column according to the invention can be obtained by retrofitting existing columns wherein existing trays or packing are replaced by the contact and separation trays such that a column is obtained as described above.

The invention is also directed for a method of contacting a vapour and a liquid at low flow parameters in a column provided with a plurality of horizontal contact trays arranged axially spaced apart in the column, further provided with a plurality of horizontal separation trays, each separation tray being spatially arranged above a contact tray. The net flow of liquid is downwards and the net flow of vapour is upwards. The method comprises that (a) liquid is supplied to a contact tray where it forms a clear liquid layer, (b) liquid droplets are dragged from the liquid layer by upwardly moving vapour to form a co-currently moving suspension of vapour and droplets, (c) liquid droplets are removed from the suspension in a separation tray, (d) removed liquid is supplied to a lower contact tray and (e) vapour, freed from liquid droplets, is supplied to an upper contact tray in such a manner that such that steps (a)–(e) are performed on all of the separation and contact trays present in the column.

Preferably the method here described is performed in a column as described above.

The invention will be illustrated by the following non-limiting example.

EXAMPLE 1

A Perspex column having an inner diameter of 0.45 m was provided with a number of trays according to FIG. 1. The tray spacing, being the distance between two contact trays, was 600 mm. To this column air was provided to flow from bottom to top and water was provided to flow from top to bottom. The so-called flow parameter, wherein the flow parameter is defined as $(L/G)*(\rho l/\rho g)^{1/2}$, was varied by varying the liquid flow rate in m³/s (L) and gas flow rate m³/s (G). In this equation the liquid density, $\rho l$, is 998 kg/m³ for water and the gas density, $\rho g$, is 1.185 kg/m3 for air. For a certain flow parameter the maximum load factor was measured wherein the maximum load factor is defined as $Ug*(\rho g/(\rho l-\rho g))^{1/2}$. For a given flow parameter it is desirable to achieve a high load factor which indicates a high capacity for such a column at the given flow parameter.

Figure 5:
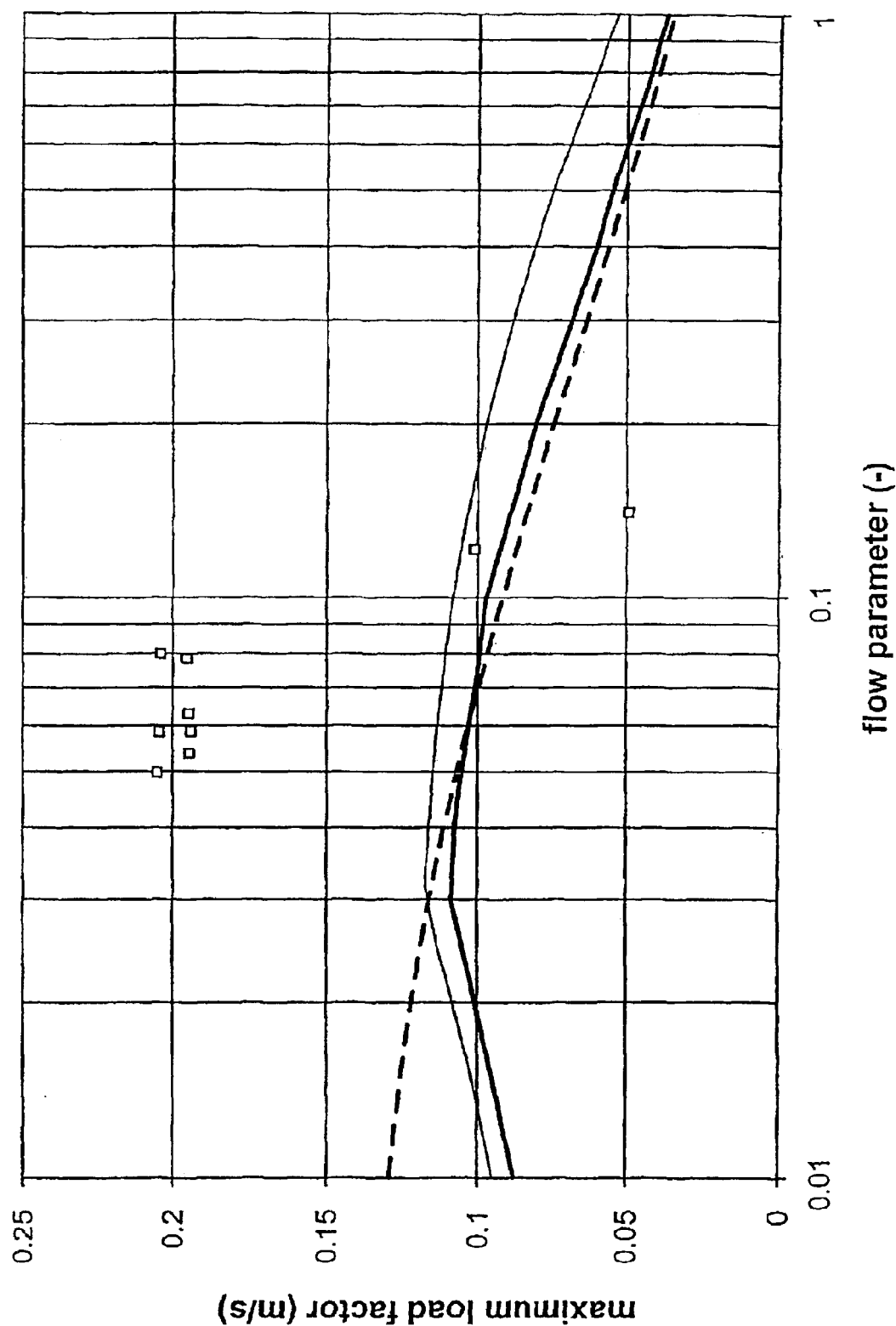
FIG. 5 shows the results of Example 1 and the comparative experiments.

The load factors for different flow parameters are presented in FIG. 5 as the boxes. The load factor for lower flow parameters than measured is expected to be around 0.2 m/s.

COMPARATIVE EXPERIMENT A

The load factor was also measured in the same column as used in Example 1, wherein column was provided with conventional downcomer trays at the same tray spacing. The thick line in FIG. 5 represented the results for this column.

COMPARATIVE EXPERIMENT B

The load factor was also measured in the same column as used in Example 1, wherein column was provided with Calming section tray as described in Belgian patent specification No. 584 426 having the same tray spacing. The thin line in FIG. 5 represented the results for this column.

COMPARATIVE EXPERIMENT C

The load factor was also measured in the same column as used in Example 1, wherein column was totally filed with a packing of the Mellapack 250 Y type (Mellapack is a trademark of Sulzer Chemtech AG). The dotted line in FIG. 5 represented the results for this column.

As can be observed from FIG. 5 the column according to the present invention shows the highest load factor in the low flow parameter range when compared to the state of the art columns.

We claim:

1. A column for counter-currently contacting vapour and liquid comprising a plurality of horizontal contact trays arranged axially spaced apart in the column, each contact tray being provided with a vapour-liquid contacting area, a liquid receiving area, a downcomer area and an overflow weir between downcomer area and contact area, and which column is further provided with a plurality of horizontal separation trays, each separation tray being spatially arranged above a contact tray, said separation tray having means to separate entrained liquids from the upwardly moving vapour and means to return the thus separated liquid to a contact tray below, wherein the vapour-liquid contacting area is provided with atomiser means where in said atomiser means liquid can be dragged from a continuous liquid phase into a flow of vapour to form a dispersion of vapour and liquid droplets.

2. The column according to claim 1, wherein the atomiser means is formed by an opening in the surface of the vapour-liquid contact area, wherein vertically above the opening a passage for upwardly moving vapour is present, which vapour passage is defined by a sidewall separating the vapour passage from the continuous liquid phase, wherein said sidewall is furthermore provided with one or more openings for passage of liquid from the continuous liquid layer present on the surface of the vapour-liquid contacting area to the vapour passage.

3. The column according to claim 2, wherein the passage for upwardly moving vapour is provided with a restriction positioned below or at the opening in the sidewall to create in the passage of upwardly moving vapour, in use, a local lower pressure which ensures that liquid flows from the tray surface via the openings in the sidewall to said passage of upwardly moving vapour.

4. The column according to claim 3, wherein the restriction is formed by an inclined lip extending from the lower end of the opening in the sidewall into the passage for upwardly moving vapour.

5. The column according to an claim 4, wherein the openings in the contact tray are a set of parallel arranged elongated rectangular openings in the vapour-liquid contacting area and wherein the openings are arranged such that liquid can flow from the liquid receiving area to the downcomer area.

6. The column according to claim 5, wherein the opening in the sidewall is one or more elongated rectangular opening(s) along the length of the sidewall.

7. The column according to of claim 6, wherein the separation means on the separation tray are swirl tubes.

8. A method of contacting a vapour and a liquid in a column provided with a plurality of horizontal contact trays arranged axially spaced apart in the column, further provided with a plurality of horizontal separation trays, each separation tray being spatially arranged above a contact tray, the net flow of liquid is downwards and the net flow of vapour is upwards, the method comprises that (a) liquid is supplied to a contact tray where it forms a clear liquid layer, (b) liquid droplets are dragged from the liquid layer by upwardly moving vapour to form a co-currently moving suspension of vapour and droplets, (c) liquid droplets are removed from the suspension in a separation tray, (d) removed liquid is supplied to a lower contact tray and (e) vapour, freed from liquid droplets, is supplied to an upper contact tray in such a manner that such that steps (a)–(e) are performed on all of the separation and contact trays present in the column.

9. The method according to claim 8, wherein the flow parameter has a value of below 0.1 and wherein the flow parameter is defined as $(L/G)*(\rho_l/\rho_g)^{1/2}$, wherein L is the liquid flow rate in m³/s, G is the vapour flow rate in m³/s, $\rho_l$ is the liquid density in kg/m³, $\rho_g$ is the vapour density in kg/m³.

10. The method according to claim 9, wherein the vapour is natural gas comprising water and the liquid is a solvent for water vapour.

* * * * *